April 14, 1925.

O. MEIROWSKY

INDUCTANCE

Filed June 11, 1923    4 Sheets-Sheet 1

1,533,749

Inventor
Oskar Meirowsky
By John B. Brady
Attorney.

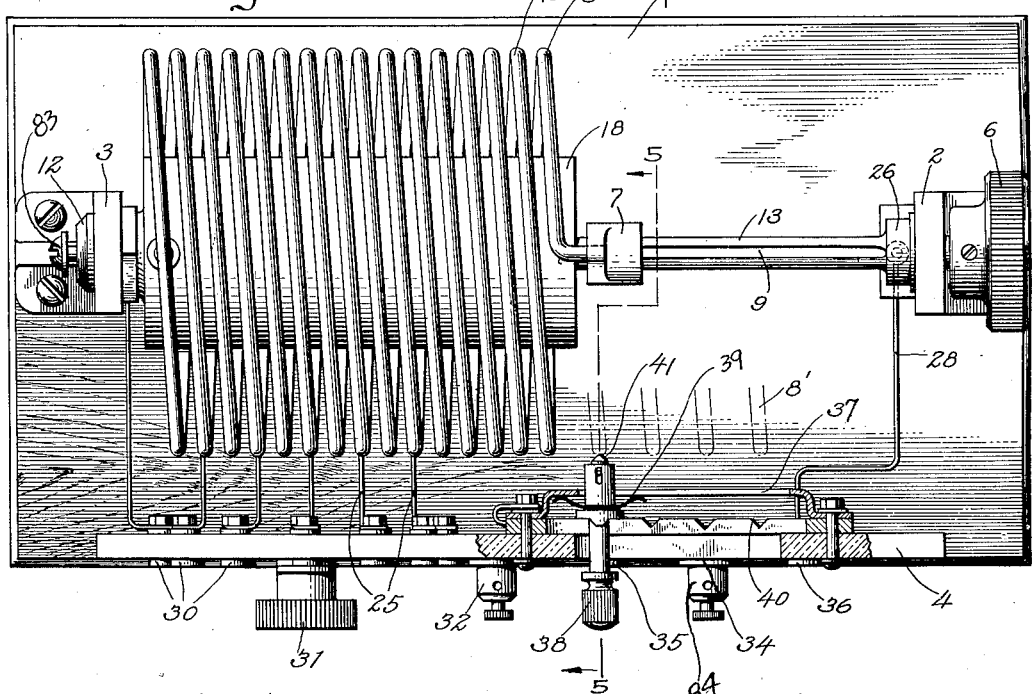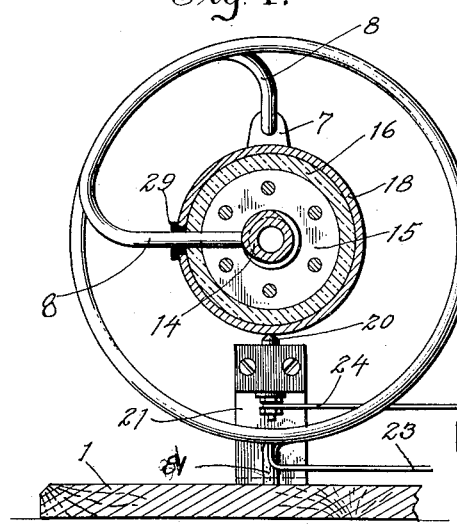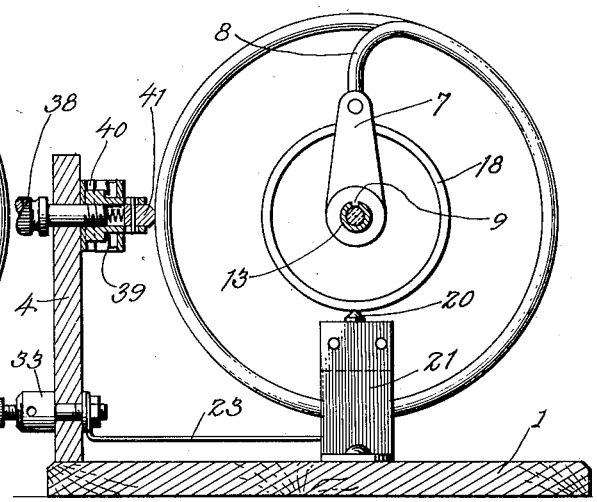

April 14, 1925. 1,533,749
O. MEIROWSKY
INDUCTANCE
Filed June 11, 1923 4 Sheets-Sheet 3
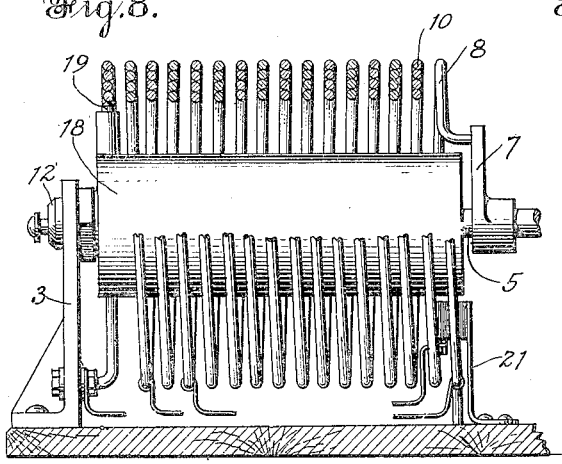
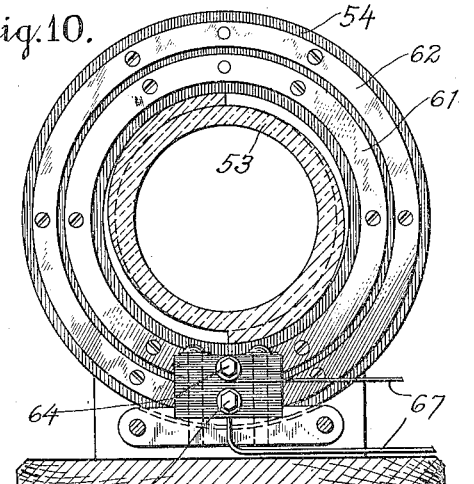
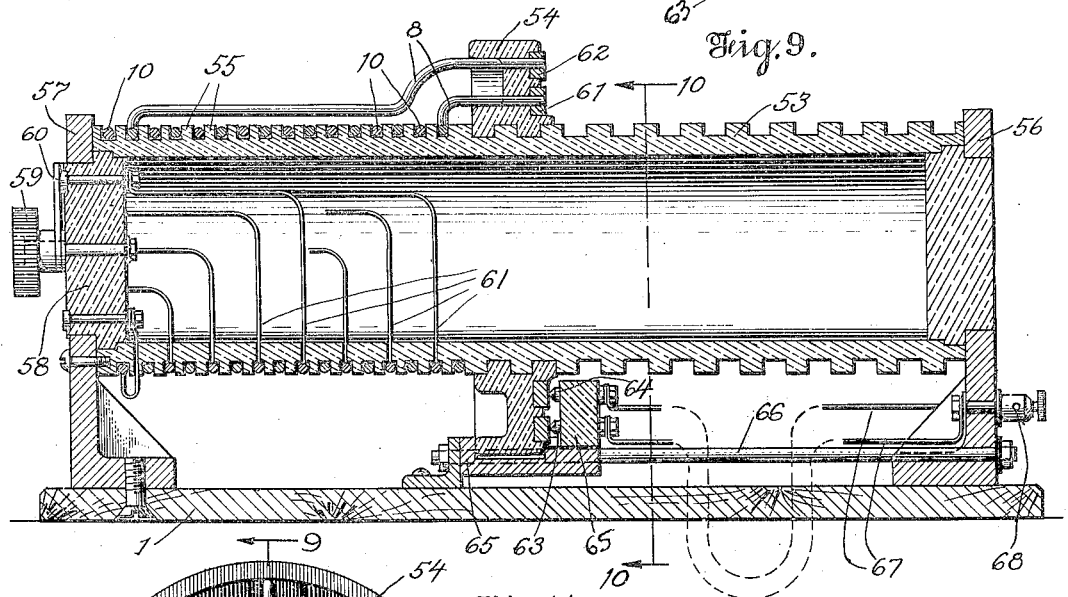
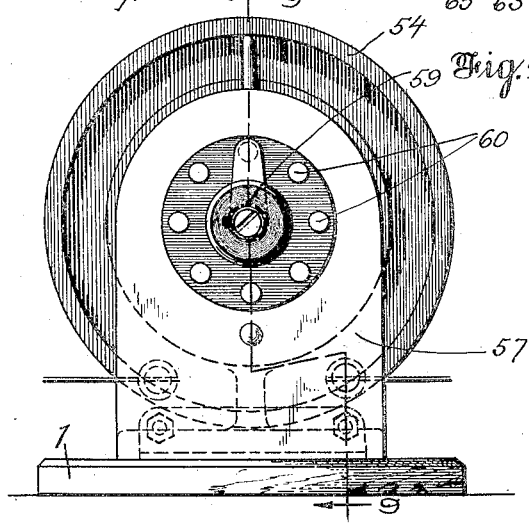
Inventor
Oskar Meirowsky.
By John B. Brady
Attorney.

April 14, 1925.  1,533,749
O. MEIROWSKY
INDUCTANCE
Filed June 11, 1923   4 Sheets-Sheet 4
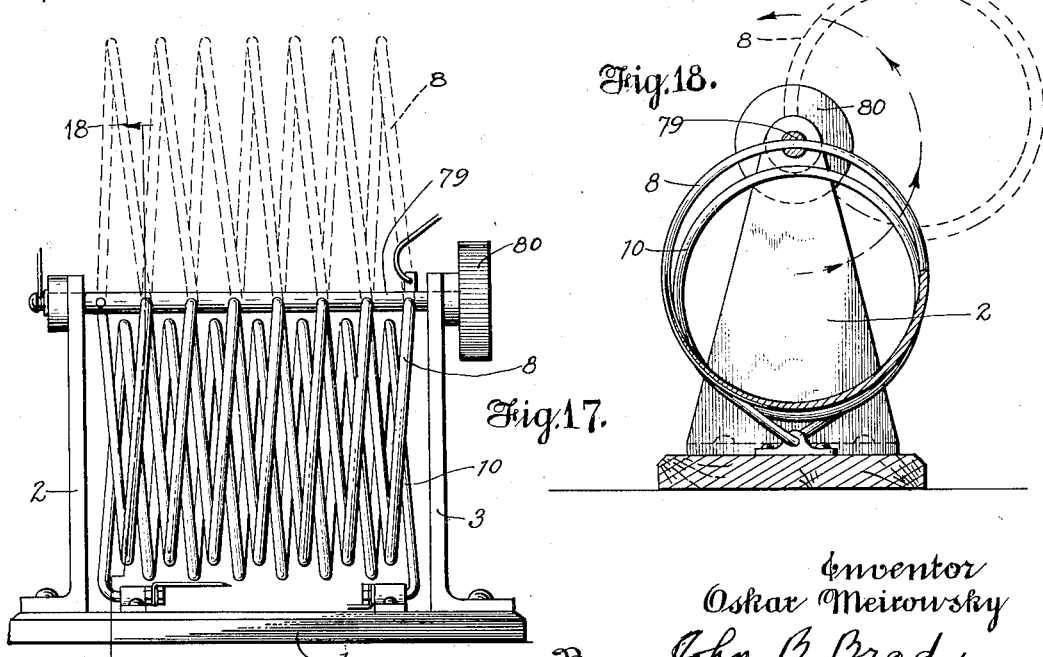

Patented Apr. 14, 1925.

1,533,749

UNITED STATES PATENT OFFICE.

OSKAR MEIROWSKY, OF PALISADE, NEW JERSEY.

INDUCTANCE.

Application filed June 11, 1923. Serial No. 644,691.

*To all whom it may concern:*

Be it known that I, OSKAR MEIROWSKY, a citizen of the Republic of Germany, residing at Palisade, in the county of Bergen and State of New Jersey, have invented a certain new and useful Improvement in an Inductance, of which the following is a specification.

My invention relates broadly to electrical apparatus, and more particularly to an inductance for connection in various electrical circuits.

One of the objects of my invention is to provide an inductance device by which extremely accurate degrees of coupling and small increments of inductance may be obtained in electrical circuits.

Another object of the invention is to provide an inductance device wherein a selected number of turns in either a primary or secondary circuit may be readily effectively placed in an electrical circuit, and wherein any fractional part of a turn may be secured.

A further object of the invention is to provide a system of inductively related coils wherein the turns of the primary alternate with the turns of the secondary.

A still further object of the invention is to provide means whereby a selected number of turns of an inductance may be arranged in an electrical circuit with a predetermined degree of coupling with an inductance connected in a different circuit.

My invention resides in various constructions by which the turns of the primary winding of my apparatus are alternately positioned between the turns of the secondary winding.

Figure 1:
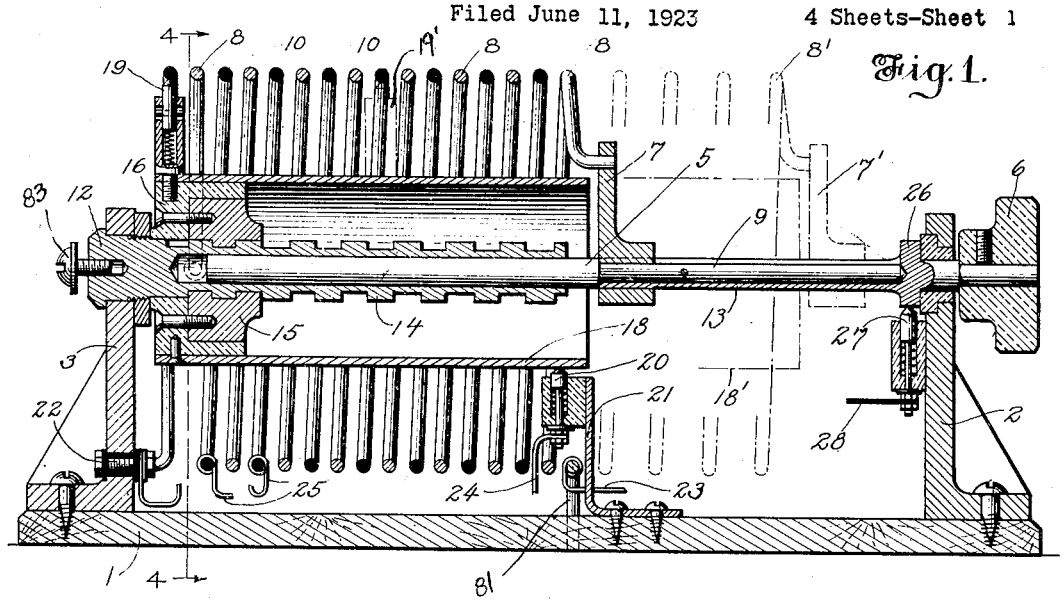
Figure 2:
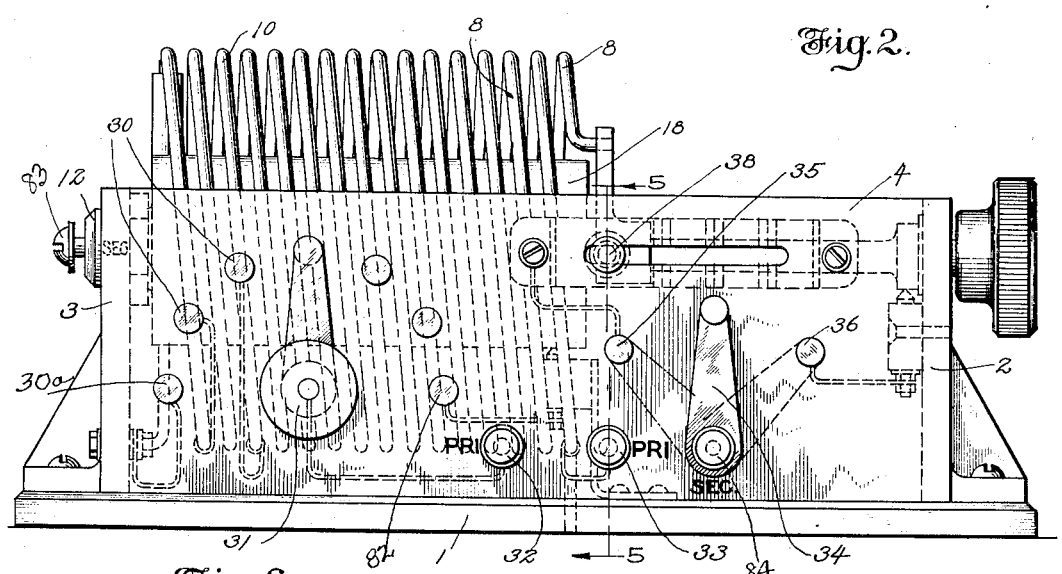
Figure 6:
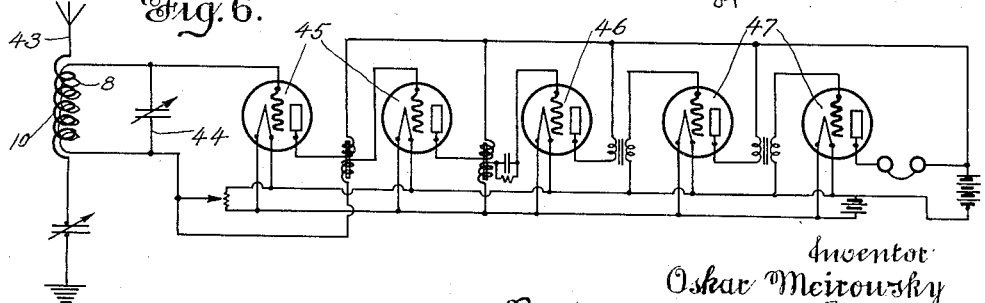

Other objects will be understood from the following specification by reference to the accompanying drawings, in which:

Figure 1 is a cross-sectional view of one embodiment of the inductance of my invention; Fig. 2 is a side elevation of the inductance illustrated in Fig. 1; Fig. 3 is a plan view of the inductance shown in Fig. 1; Figs. 4 and 5 are views partially in section taken along lines 4—4 of Fig. 1 and 5—5 of Fig. 3; Figs. 6 and 7 are wiring diagrams illustrating applications of my invention; Fig. 8 is a view partially in cross section of a modified form of my inductance having a plurality of layers in the primary and secondary windings; Fig. 9 is a cross-sectional view of a modified form of my inductance; Fig. 10 is a view partially in section taken on line 10—10 of Fig. 9; Fig. 11 is an end view in modified form of inductance illustrated in Fig. 9; Figs. 12, 13 and 14 are views of another modification in inductance of my invention showing the alternate positions of primary and secondary windings; and Figs. 15, 16, 17, and 18 show further forms in which my invention may be embodied.

In the drawings, the apparatus is mounted upon a base 1 with standards 2 and 3 at opposite ends thereof forming bearings for shaft members 5 and 12. The shaft member 12 is secured in the standard 3 and has a hollow bore which receives and supports the shaft 5. The shaft 5 comprises insulating material reduced in cross section at 9 to receive a metallic sleeve 13 forming a contact bearing and a keyway along which the member 7 is adapted to slide. The member 7 carries the turns 8 of a secondary inductance which are alternately positioned between the turns 10 of a primary inductance. The member 12 is threaded as represented at 14 with the same pitch as exists between the turns of the secondary coil 8. A threaded carrier 15 is secured to the other end of the secondary coil 8, the end of the secondary passing through insulated bushing 29 (Fig. 4) positioned in metallic tube 18. The carrier 15 is secured in one end of the tube 18 by means of the insulated disk 16. Upon rotation of the shaft 5 by means of hand knob 6 the entire secondary 8 between member 7 and carrier 15 advances to such positions as represented by dotted lines 7' and 8', the member 7 sliding along the keyway in sleeve 13 throughout the portion of the shaft 5 at 9. The primary inductance 10 with its turns positioned alternately with those of the secondary is solidly supported at 22 and 81. A sliding contact 19 is carried by the tubular member 18 making contact with the turns 10 of the primary. At the opposite end of the tube 18 a contact 20 is provided supported upon bracket 21 whereby electrical connection is completed through the metallic walls of the cylinder 18 with the sliding contact 19 independent of the position of the cylinder in process of advancing to such position as 18'. The primary turns are tapped as indicated at 25 and connections taken to switch points 30 mounted upon panel 4. The terminals for the primary inductance are represented at 32 and 33, the terminal 32 being connected to the switch arm 31 selecting the desired number of turns in the primary circuit. The terminal 33 is connected to the last turn of the primary at 81. The contact 20 which makes connection with the metallic cylinder 18 is connected through conductor 24 with switch contact 82 so that when the switch arm 31 is positioned over contact 82 any fractional part of a turn in the primary inductance is connected in the circuit between terminals 32 and 33. The terminals for the secondary inductance are represented at 83 and 84. Terminal 84 connects to a switch 34 having contacts 35 and 36. Contact 36 is connected through a conductor 28 with a wiping contact 27 bearing upon collector ring 26 in electrical connection with sleeve 13 and from thence to the end of secondary coil 8 through member 7. The other end of the secondary coil 8 being permanently anchored in member 15 is at all times in electrical connection with terminal 82 as the member 15 advances along the threads 14 in member 12. The contact 35 is connected to an adjustable contact 41 mounted upon a bracket 37 secured to panel 4. The contact 41 may be longitudinally moved by knob 38 under tension of spring 39 projecting through a slot in the panel 4. Notches 40 are provided spaced in accordance with the pitch of the secondary turns 8. By providing this adjustable contact 41 a particular number of turns in the secondary may be subjected to the inductive effect of an exactly equal number of turns or any minute fractional part of a turn of the primary. As the knob 6 is rotated the secondary coil 8 with the primary sliding contact assembly 19, 18, 16 and 15 rotates and advances axially to the right. At all times during rotation and while at rest the turns 8 of the secondary contact with adjustable contact 41 and from there through switch contact 35 and switch 34 with terminal post 84. That portion of the secondary advancing beyond 41 when the switch 34 is positioned upon contact 35 is dead or not in use. The primary contact 19 advances to the same extent and the turns of the primary 10, all of the turns to the left of contact 19 are dead.

An infinite variety of adjustments may be obtained by use of my inductance as represented by the following examples. A diminishing number of turns of the secondary 8 may be obtained while current is flowing in a given number of turns of the primary 10. Switch 34 is placed on contact 35. The primary switch 31 is placed on contact 30ª. The full number of turns in the primary will now be always in the circuit irrespective of the position of contact 19. By moving the primary switch 31 over the contacts with the exception of contact 82 cuts out the primary by a full number of turns. By moving switch 31 to contact 82 a full number of turns and a fractional part of a turn may be included in the primary.

Another combination which may be obtained provides the full number of turns in the secondary and a particular number of turns in the primary. To accomplish this switch 34 is moved to contact 36 placing the entire secondary in the circuit, and the switch arm 31 is placed on a particular contact connecting in a certain number of turns of the primary.

Another combination provides a full number of turns in the secondary and a diminishing number of turns in the primary where switch lever 34 is on contact 36 and where switch arm 31 is moved over the range of contacts to select a desired number of turns.

A further combination may be obtained with diminishing secondary turns but with more turns in the circuit than are interspaced with the primary turns. This is accomplished by placing switch arm 34 on contact 35 and moving the sliding contact 41 to the right on rack 40, the notches in which are spaced similarly to the pitch of the screw threads 14. By moving contact 41 one, two, three or more spaces the secondary turns 8 do not make contact with contact 41 immediately upon emerging from the primary turns 10, but one, two, three or more spaces removed from the last turn of the primary. Each space is equivalent to one turn so that there are always one, two, three or more turns, as the case may be, in circuit than are intermeshed with the primary turns. Simultaneously with this operation the primary turns may be selected by moving switch arm 31.

My inductance is applicable for extremely fine tuning in electrical circuits, particularly circuits in radio apparatus where the electrical constants must be adjusted to resonance with the incoming frequencies. With my inductance the electrical envelop characteristic of the receiving circuit may be made to exactly coincide with the envelop characteristic of the incoming signal energy. This is of great importance where precise tuning of circuits is necessary to receive signals transmitted on closely adjacent wavelengths, or to fix the precise wavelength of the transmitter.

Figs. 6 and 7 indicate applications of my variable inductance. In Fig. 6 the secondary 8 and primary 10 form the coupling means between a receiving antenna system 43 and a receiving apparatus. It will be noted that the primary 10 and secondary 8 are shown with their conductors alternately positioned. A condenser 44 is used for tuning the secondary circuit. Electron tubes 45 serve as radio frequency amplifiers, tube 46 functions as a detector, and tubes 47 operate as audio frequency amplifiers. In Fig. 7 my inductance is shown as auxiliary to a variocoupler having windings 48 and 49. Fine tuning is obtained by the infinite variety of adjustments capable in my inductance while broad tuning is obtained by the usual coupling system.

It may be desirable to utilize a multiple layer coil for the primary and secondary windings as represented in Fig. 8 wherein the four layers of secondary coil 8 are axially moved relative to the four layers of primary coil 10.

In the modified form of inductance illustrated in Fig. 9 an insulated tube 53 is provided supported at each end in standards 56 and 57 on base 1. The secondary coil 8 is alternately wound between the turns of the primary coil 10 in grooves separated by the insulated threads 55. The primary 10 is stationary and is tapped at various turns as indicated at 61, which taps are brought to switch points 60 on panel 58 whereby switch 59 may select a desired number of turns in the primary, the secondary coil 8 is attached to hand wheel 54, the ends thereof being anchored to collector rings 61 and 62. The hand wheel 54 rotates in threads upon the cylinder 53 advancing the secondary relative to the primary very gradually. Sliding contacts 63 and 64 are carried upon a runner 65 arranged to slide on guide rods 66 as the hand wheel 54 advances. Flexible conductors 67 connect to contacts 63 and 64 with binding posts 68 forming the terminals for the secondary.

In Fig. 12 the secondary 8 and primary 10 are alternately wound in a vertical plane. The coupling may be changed by rotating the hand wheel 6 serving to rotate the coil 8 in dotted line positions 8' as indicated in Fig. 13.

Fig. 13 taken on line 13—13 of Fig. 12 indicates the primary 10 supported in stationary position through the stationary shaft 69.

Fig. 14 illustrates a further modification where the shaft 70 is adjacent the base 1 and supports the stationary primary coil 10 between the turns of which the secondary coil 8 may be moved.

Figs. 15 and 16 illustrate a further modification in which the primary coil 10 and secondary coil 8 are spirally wound, one winding alternating with the other winding. The primary winding 10 is supported on panel 71 and the secondary winding 8 on panel 72. This panel 72 is pivoted to swing relative to panel 71 and may assume position 72' with the secondary coil at 8' for changing the coupling between the circuits. The distance between the coils 8 and 10 may be changed by loosening hand screw 74 and laterally moving the panel 72 along guides 73. In this way the spiral windings may be intermeshed in a common plane when in the position of maximum inductive effect. This form of inductance might utilize a standard 77 with advancing screw 76 operating from hand wheel 78 moving panel 74 carrying secondary 8" so that it may be intermeshed with the spiral 10.

Figs. 17 and 18 illustrate another modification of my invention wherein the secondary 8 and primary 10 are wound in the form of helixes. The primary helix 10 is supported rigidly on the base 1 while the secondary helix 8 is carried by shaft 79 which may be rotated by hand wheel 80 to vary the coupling between the circuits.

While I have described my invention in certain specific embodiments, the illustrations of the primary and secondary windings have necessarily shown the turns of relatively large diameters in order to clearly bring out the invention, but it is understood that various sizes of coils may be employed and that the apparatus is applicable in any electrical circuit and that no limitations upon the invention are intended other than are imposed by the scope of the appended claims.

What I claim and desire to secure by Letters Patent of the United States is as follows:

1. An inductance system comprising in combination a primary coil and a secondary coil, said primary coil being fixed in position with its turns spaced one from another, and means for moving the turns of said secondary coil in an axial direction between the turns of said other coil.

2. An inductance system comprising in combination a spiral primary coil and a spiral secondary coil, said primary coil being fixed in position with its turns spaced apart, said secondary coil having its turns spaced apart and alternately positioned between the turns of said primary coil, and means for varying the coupling by relatively moving one of said coils in an axial direction whereby one winding intermeshes with the other winding.

3. An inductance system comprising in combination a straight helical primary winding having its turns spaced apart and fixed in position, a straight helical secondary winding having its turns similarly spaced apart, and means for variably intermeshing the turns of said secondary winding with the turns of said primary winding.

4. An inductance system comprising in combination a helical primary winding having its turns spaced apart, a helical secondary winding having its turns similarly spaced apart, all of said turns having substantially the same diameter in corresponding layers thereof and means for axially moving said secondary winding relative to said primary winding for the purpose of having more or less turns of said windings mutually intermesh to varying degrees.

5. An inductance system comprising in combination helical primary and secondary windings having their turns mutually intermeshed, means for varying the coupling between said windings by axially moving one of said windings relative to the other, a switch for selecting the effective number of turns in one of said windings, a contact rotatable simultaneously with the axial movement of the other of said windings for selecting any fractional part of a turn in said winding, and an adjustable contact for varying the effective number of turns in said axially movable winding.

6. An inductance system comprising in combination helical primary and secondary windings having their turns mutually intermeshed, a shaft axially positioned within said windings, and a pair of carriers longitudinally movable on said shaft, one of said carriers arranged to advance one of said windings relative to the other, and the other of said carriers adapted to make variable contact with the turns of said other winding.

7. An inductance system comprising in combination helical primary and secondary windings having their turns mutually intermeshed, an insulated shaft positioned through said windings, a bearing member for one end of said shaft, a slotted metallic sleeve carried by another portion of said shaft, a carrier longitudinally movable along said slotted sleeve, threads on said bearing member, and a second carrier rotatably mounted on said threads, said carriers forming supporting means for said secondary winding whereby said secondary may be axially movable relative to said winding.

8. An inductance system, comprising in combination a primary winding and a secondary winding, the turns of one winding being mounted for rotative and axial movement with respect to the turns of the other winding whereby the turns of one winding may be alternately positioned between the turns of the other winding for securing maximum inductive effect between the windings.

OSKAR MEIROWSKY.